(12) United States Patent
Morris et al.

(10) Patent No.: US 9,494,740 B2
(45) Date of Patent: Nov. 15, 2016

(54) OPTICAL ARCHITECTURE WITH RISER CARDS A MATRIX AND OPTIC CABLES TO CARRY OUTBOUND SIGNALS OF THE MATRIX TO THE RISER CARDS

(75) Inventors: Terrel L. Morris, Garland, TX (US); Michael Renne Ty Tan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 118 days.

(21) Appl. No.: 14/365,261

(22) PCT Filed: Jan. 31, 2012

(86) PCT No.: PCT/US2012/023407
§ 371 (c)(1),
(2), (4) Date: Jun. 13, 2014

(87) PCT Pub. No.: WO2013/115808
PCT Pub. Date: Aug. 8, 2013

(65) Prior Publication Data
US 2014/0348465 A1    Nov. 27, 2014

(51) Int. Cl.
*G02B 6/28* (2006.01)
*G06F 13/40* (2006.01)
(Continued)

(52) U.S. Cl.
CPC .............. *G02B 6/2817* (2013.01); *G02B 6/28* (2013.01); *G02B 6/4295* (2013.01); *G02B 6/4471* (2013.01); *G02B 6/4479* (2013.01); *G06F 13/385* (2013.01); *G06F 13/4045* (2013.01); *G02B 2006/12104* (2013.01); *G02B 2006/12164* (2013.01); *Y02B 60/1228* (2013.01); *Y02B 60/1235* (2013.01)

(58) Field of Classification Search
CPC  G02B 6/2817; G02B 6/4471; G02B 6/4479; G02B 6/28; G02B 6/12164; Y02B 60/1228; Y02B 60/1235; G06F 13/4045; G06F 13/385
USPC ................ 385/14–24, 88–90, 147, 40–48
See application file for complete search history.

(56) References Cited

U.S. PATENT DOCUMENTS 5,576,872 A   11/1996   Kitajima et al.
6,049,476 A   4/2000    Laudon et al.
(Continued)

FOREIGN PATENT DOCUMENTS

CN    1764854 A     4/2006
CN    101952756 A   1/2011
WO    WO-2010126463 A1  11/2010

OTHER PUBLICATIONS

International Search Report and Written Opinion, Oct. 10, 2012, PCT Patent Application No. PCT/US2012/023407, 10 pages.

*Primary Examiner* — Akm Enayet Ullah
(74) *Attorney, Agent, or Firm* — Hanley, Flight & Zimmerman, LLC

(57) ABSTRACT

Methods and apparatus for optical architectures are disclosed. An optical architecture includes first and second riser cards and first and second components carried by the first and second riser cards respectively. The optical architecture also includes a first matrix to fan-out a multi-bit optical input signal into first and second outbound signals, and first and second fiber optic cables to carry the first and second outbound signals to the first and second riser cards, respectively.

20 Claims, 8 Drawing Sheets

(51) Int. Cl.
  *G06F 13/38* (2006.01)
  *G02B 6/42* (2006.01)
  *G02B 6/44* (2006.01)
  *G02B 6/12* (2006.01)

(56) References Cited

U.S. PATENT DOCUMENTS

| | | |
|---|---|---|
| 6,404,942 B1 | 6/2002 | Edwards et al. |
| 6,445,841 B1* | 9/2002 | Gloeckner ............ G02B 6/3514 385/17 |
| 6,516,110 B2 | 2/2003 | Hayashi et al. |
| 6,731,515 B2* | 5/2004 | Rhoads ................ H05K 7/1444 361/785 |
| 7,298,908 B2* | 11/2007 | Lewis ...................... G06K 9/74 382/211 |
| 7,360,104 B2 | 4/2008 | Harris et al. |
| 7,996,602 B1 | 8/2011 | Warnes et al. |
| 2002/0047637 A1* | 4/2002 | Victor .................... H01J 31/06 315/294 |
| 2002/0063924 A1* | 5/2002 | Kimbrough .......... H04B 10/272 398/79 |
| 2002/0141170 A1 | 10/2002 | Rhoads |
| 2003/0236916 A1* | 12/2003 | Adcox ............. H04L 29/12018 709/245 |
| 2004/0080285 A1* | 4/2004 | Victor .................... H01J 31/06 315/365 |
| 2004/0126065 A1 | 7/2004 | Levy et al. |
| 2005/0050205 A1 | 3/2005 | Gordy et al. |
| 2006/0067611 A1 | 3/2006 | Frisken et al. |
| 2008/0222351 A1 | 9/2008 | Verdiell et al. |
| 2009/0097851 A1 | 4/2009 | Tan et al. |
| 2010/0003029 A1 | 1/2010 | Dress et al. |
| 2011/0052120 A1 | 3/2011 | Tan et al. |
| 2011/0058812 A1 | 3/2011 | Ty Tan et al. |
| 2011/0149499 A1 | 6/2011 | Bandholz et al. |
| 2011/0211843 A1 | 9/2011 | Tan et al. |

* cited by examiner

OPTICAL ARCHITECTURE WITH RISER CARDS A MATRIX AND OPTIC CABLES TO CARRY OUTBOUND SIGNALS OF THE MATRIX TO THE RISER CARDS

FIELD OF THE DISCLOSURE

This disclosure relates generally to optical communications and, more particularly, to optical architectures, optical distribution matrices, and methods of manufacturing optical structures.

BACKGROUND

As computer system manufactures continue to increase computer system performance while limiting the increase in energy consumption or cost, computer system manufactures have turned to photonics and the establishment of optical communications paths to transmit data between system components. Fiber optic technology has already been implemented in a variety of industries such as telecommunications. Computer system manufacturers are now developing this technology for application in the field of optical computing.

BRIEF DESCRIPTION OF THE DRAWINGS

For clarity, the thickness of the layers are enlarged in the drawings. Wherever possible, the same reference numbers will be used throughout the drawing(s) and accompanying written description to refer to the same or like parts.

DETAILED DESCRIPTION

Developers of communication architectures struggle to balance the desires for increased performance with the desires for lower power consumption, smaller form factor, and lower electromagnetic emissions. Achieving better scalability while reducing power consumption in computer systems is likewise desirable. However, known solutions to these problems have increased the cost of many computer systems with increased pin count, increased die area, and/or because of increased power consumption.

It would be beneficial to provide a system having high speed interconnects that maintain signal integrity, consume relatively less power than known systems, and support lower latency topologies. It is likewise desirable to provide such a system with multiple receivers connected to one or more drivers.

Many known optical interconnect systems are implemented using hollow metal waveguides built into optical circuit boards having bulky form factors not conducive to easy integration with current standard computer components. As a result, although optical interconnects can span much greater distances than electrical interconnects without exhibiting some of the problems of such electrical systems, the rigid nature of optical circuit boards still places constraints on the location and position of the optical interconnects relative to the components they are connecting. As such, many known optical circuit boards are custom built for every new system they are to connect rather than being configurable to different systems.

Figure 1A:
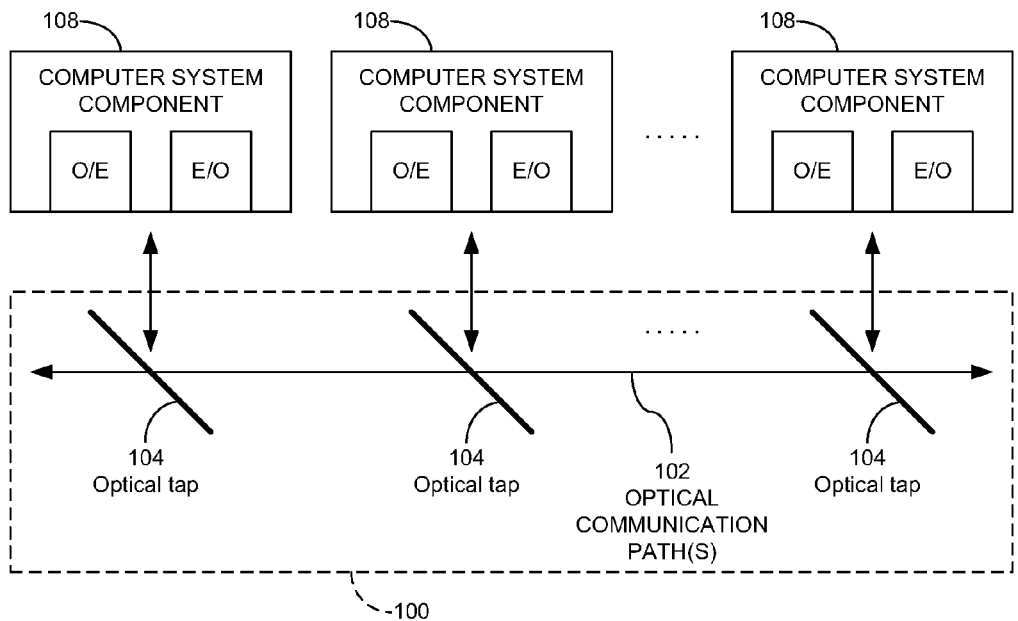
FIG. 1A is a block diagram view of an example optical architecture for providing optical communication between computer system components in accordance with the teachings of the present disclosure.

FIG. 1A is a block diagram of an example optical architecture 100 for providing optical communication between computer system components. In the illustrated example, the optical architecture 100 comprises one or more optical data communication paths or interconnects 102 and a plurality of optical taps 104. Each of the optical taps 104 optically couples a respective computer system component to a respective optical data communication path 102. In the example of FIG. 1A, optical to electrical conversion (O/E) is performed for signals received by a component from the interconnects 102, and electrical to optical (E/O) conversion is performed for signals from the computer component to be optically coupled onto the data communication path(s) 102 via the corresponding tap 104. An optical data communication path is referred to interchangeably as an optical interconnect in this patent.

Large core, hollow waveguides represent substantial improvement over traditional optical waveguides formed using polymers or dielectric materials. An example large core hollow waveguide can have a diameter (or width and/or height) on the order of 50 to 150 or more times a wavelength of the coherent light the waveguide is configured to guide. Such an example large core hollow waveguide can have a cross-sectional shape that is square, rectangular, round, elliptical, or any other shape able to guide an optical signal.

Furthermore, because such an example waveguide is hollow, the light travels at approximately the speed of light in air or a vacuum.

Each of the optical taps 104 of the illustrated examples is implemented to tap off a portion of power of an incident optical signal. In some examples, the optical taps 104 are implemented with pellicle beam splitters with suitable optical coatings so as to yield a desired amount of reflectivity, transmissivity, and/or known optical loss. In some such examples, the pellicle beam splitter employs non-polarizing coatings so as to reduce (e.g., minimize) differences between the reflected and transmitted portions of a signal as a function of input polarization of light. Furthermore, the thinness of pellicle beam splitters reduces (e.g., minimizes or even eliminates) ghosting or beam walk-off so that the incident beam remains substantively on-axis. In some examples, the optical taps 104 are implemented with optical scatterers or optical splitters. The splitter(s) can have any desired size(s) and/or geometric configuration(s) (e.g., a triangular or a diamond shape). In some examples, the optical taps 104 are implemented with sub-wavelength metallic structures which reflect and transmit the desired light. The amount of reflectance and transmittance can be approximately estimated by the "fill factor" of the metallized to unmetallized regions. In some examples, the optical taps 104 are implemented with Y-splitters, fused splitters, and/or any other suitable beam splitter.

In the illustrated examples, each tap 104 diverts about the same amount of power from an input signal 114 received from the memory controller 106. For each tap 104 to divert approximately the same amount of power, the power ratio of reflectivity and transmissivity of each tap 104 of the illustrated examples differs from the other taps 104 along a corresponding communication path 112 according to the relative positions of the taps 104 along the communication path 102. For example, a portion of an optical signal travelling along the data communication path 102 is reflected to its associated computer component via a corresponding tap 104. The remaining portion of the optical signal passes through the corresponding tap 104 to continue on the optical data communication path 102 (e.g., to the next tap). The power of the portion of the signal reflected and the portion of the signal passing through each tap 104 is determined by the respective power ratio of that tap 104.

In some examples, the power ratios of the taps 104 are such that an optical receiver for a destination computer system component receives signals having substantially the same amount of power regardless of the number of taps 104 each signal passes through along the interconnects 102. In other words, the power of the signal received by any given optical receiver for a destination computer system component is substantially the same as the power of a signal received by any other given computer system component fed by another tap of the system.

Figure 1B:
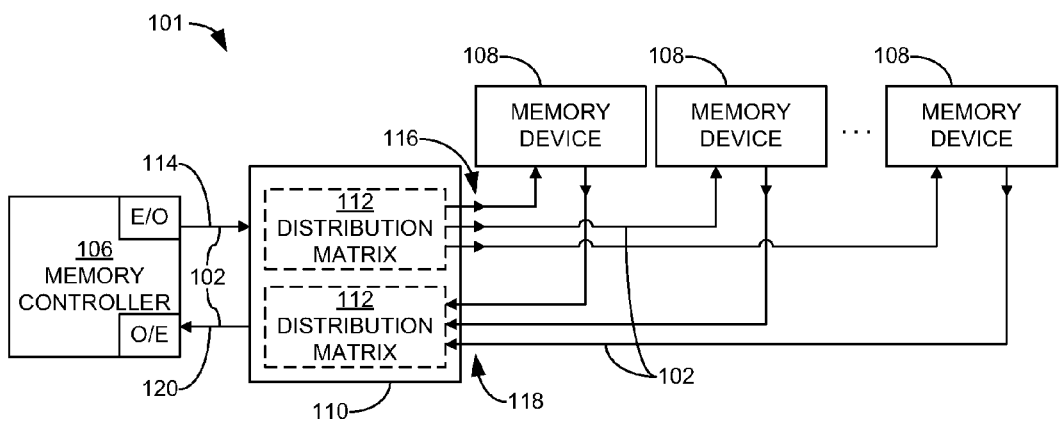
FIG. 1B is a block diagram view of an example distribution system employing components communicatively coupled via the optical architecture of FIG. 1A.

FIG. 1B is a block diagram of an example memory distribution system 101, communicatively coupled via the example optical interconnect system of FIG. 1A. The example memory system 101 includes a memory controller 106 that communicated with a plurality of memory devices 108 via an optical distribution structure 110. The distribution structure 110 of the illustrated examples has two distribution matrices 112, one for inbound signals and one for outbound signals, that contain the optical taps 104 shown in FIG. 1A. In the illustrated example, the optical distribution structure 110 receives an input signal 114 from the memory controller 106 and fans-out the input signal 114 via the taps 104 within one of the distribution matrices 112 into a plurality of outbound signals 116 which are bused to each of the memory devices 108.

In some examples, the outbound signals 116 are in the form of packets that include headers. Each header identifies a particular memory device 108 as the destination for data carried by the outbound signals 116. Thus, while all of the memory devices 108 in the illustrated example receive the same signal (i.e., each outbound signal 116 is substantively the same as every other outbound signal 116), because the header of each packet identifies a particular memory device 108 as the destination of the data, only the memory device 108 identified by the header actually processes (e.g., stores) the information encoded in the optical signals 116. A memory device 108 receiving a signal with the header of a different memory device 108 merely discards the signal. In other examples, arbitration can be used to determine which memory device(s) 108 process the broadcast signal 116.

In the illustrated example, to read data out of the memory structure, each of the memory devices 108 transmits an inbound signal 118 back to the memory controller 106 via the distribution structure 108. As a result, the second distribution matrix 112 of the distribution structure 110 in the illustrated example receives a plurality of inbound signals 118 and fans-in the inbound signals 118 via the optical taps 104 to provide a single output signal 120 transmitted to the memory controller. While each of the plurality of inbound signals 118 corresponding to a respective one of the plurality of memory devices 108 is fanned in to a single output signal 120 of the distribution structure 108 in the illustrated example, the inbound signals 118 are not necessarily transmitted at the same time.

In some examples, the memory controller 106 is included in an integrated circuit such as a processor having other functions and/or interface(s) to other integrated circuits. The memory controller 106 of the illustrated example is in communication with or includes device(s) to perform electrical to optical (E/O) and/or optical to electrical (O/E) conversions to send and/or receive the input and output signals 114 and 120 of the distribution structure 110. For example, the E/O driver may be a vertical cavity surface emitting laser (VCSEL) and/or the O/E driver may be a photodiode. When data is output by the memory device 108, the memory controller 106 first sends an addressing signal calling the local memory device 108 to output its data. Without such an addressing approach, the memory controller 106 could receive optical signals from more than one memory device on the same optical communication path, and such optical signals could constructively and/or destructively combine to deliver inaccurate data at the memory controller 106. The addressing logic of the memory controller 106 ensures that before the inbound paths of the interconnects 102 can be used, a memory device 108 is granted permission to transmit an inbound signal 118, in order to prevent simultaneous optical signal transmissions to the memory controller 106. In other examples, the addressing scheme is replaced with time-division multiplexing ("TDM"). In such a TDM approach, signal transmission is carried out in rounds. Each round corresponds to a signal transmission time period. Each memory device 108 is assigned one of the signal transmission time periods to transmit an inbound signal 118. Each memory device 108 can transmit an inbound signal 118 only within its assigned time period. In this manner, the memory controller 106 can discern at any given moment the source of each output signal 120 received via the distribution structure 110. In systems in which data is redundantly stored in all memory devices 108, neither TDM nor the above addressing scheme is required as the signals will be output simultaneously to constructively combine to create the output signal 120.

For illustrative purposes, the example distribution system 101 of FIG. 1 is shown with the memory controller 106 and the plurality of memory devices 108. However, the system 101 may be used with other devices of different functions, such as other processing units or interface devices. As a different example, the plurality of memory devices 108 may be different from one another, the memory devices 108 may perform different type(s) of function(s), and/or the memory devices may be implemented with different technologies.

The example system 101 includes optical interconnects 102 and the distribution matrices 112 for communication between the memory controller 106 and the plurality of memory devices 108. In the illustrated example, the distribution matrices 112 contain the optical taps 104 of FIG. 1A to fan-in and/or fan-out the signals through different branches of the optical interconnects 102. In the illustrated example, the optical interconnects 102 are formed with unidirectional optical interconnects (e.g., ingress and egress, inbound and outbound, etc.) providing communication paths in opposite directions. In other examples, the optical interconnects 102 provide bidirectional communication between the memory controller 106 and the plurality of memory devices 114 through a single bidirectional optical path 102. In some examples, this can be done through the use of different wavelengths (i.e., wavelength-division multiplexing) with at least one wavelength used for broadcasting outbound signals and at least another, different, wavelength used for receiving inbound signals. In other examples, this can be done through time-division multiplexing where the outbound and inbound signals take turns based on a schedule to transmit respective signals. In such examples, the distribution structure 108 may be formed using only one distribution matrix.

The power ratios of reflectivity and transmissivity for the optical taps 104 in the optical interconnect system 100 are set in the illustrated example system 101 so that the memory controller 106 and the plurality of memory devices 108 communicate with optical signals of desired power to achieve a desired communication reliability while reducing (e.g., minimizing) power consumption. In some examples, a bit error rate (BER) of $<10^{-12}$ suffices as an acceptable metric for the communication reliability. The optical receiver sensitivity of photo-detectors used to receive the optical signals passing through the interconnects 102 can be used to determine a minimum average optical power needed for a given BER. Optical receiver sensitivities of around −17 dBm (20 microwatts) at 10 Gb/s have been demonstrated, while −15 dBm (32 microwatts) is more typical for BER of $<10^{-15}$.

Light speed or near light speed transmission over the optical interconnects 102 places challenges for reliably performing the fault sensing described above. For example, the memory controller 106 may be required to discern increments of approximately 150-160 picoseconds for delta time of flight between the plurality of memory devices 108 considering the physical length of the optical interconnects 102, the speed of light, and the accuracy required to discriminate data returning from each of the plurality of memory devices 108. However, these increments are typically smaller or in some cases half of the output uncertainty (clock to out) for each driver.

To mitigate the differences between the increments and the output uncertainty described above, a training pattern may be used over each branch of the optical interconnects 102 where the sender is known for each transfer, which allows adjustment of the timing of the received data. The timing can then be adjusted within the memory controller 106 using timing adjustment techniques. With the timing relationship established, normal data transfers may be initiated over the optical interconnects 102. In some examples, the timing adjustment may increase operating frequency (e.g., the maximum operating frequency) of the optical interconnects 102 beyond normal operating frequencies of the plurality of memory devices 108 potentially allowing over-clocking the plurality of memory devices 108.

In some examples, the desired power of signals communicated between components is substantially the same regardless of the signal's source location, ensuring a desired communication reliability. Typically, the power ratios are determined using ray trace modeling of the target system to satisfy the communication reliability metric for the system and reduce (e.g., minimizing) power consumption. In addition to the ratios, the optical transmitter power, the optical receiver sensitivities, the optical distance between sources and receivers, and the loss characteristics of the optical path are examples of other considerations to be accounted for in the ray trace modeling. In some examples, an iterative algorithm adjusting the various considerations is used to model the optical interconnect system 100 until a desired communication reliability metric is achieved. Then the ratios are set for the optical taps during manufacturing and/or assembly for the target system (e.g., the system 101).

For illustrative purposes, the example system 101 is shown having the optical interconnects 102, although it is understood that the computer system 101 may have other interconnects, including optical and/or electrical connections. Furthermore, each branch may transmit a single bit of information at a time or transmit a multi-bit signal as is described in detail below. Accordingly, as used herein, the term 'signal' may refer to a multi-bit signal or to an individual bit of the multi-bit signal. Also for illustrative purposes, the computer system 101 is shown having the memory controller 106 and the plurality of memory devices 108. However, the system 101 may have other components (not shown) or parts (not shown) that may be connected or not connected to the optical interconnects 102.

The system 101 of the illustrated example may utilize the plurality of memory devices 108 in a number of ways. For example, the plurality of memory devices 108 may provide cumulative memory capacity, provide striped memory for added performance, or provide redundant fail-over memory for a fault tolerant memory architecture.

In the illustrated examples, the plurality of memory devices 108 connect with or include devices for performing optical to electrical (O/E) conversion and vice versa for signals to and from their respective branches of the optical interconnects 102 with a desired optical power.

Figure 2:
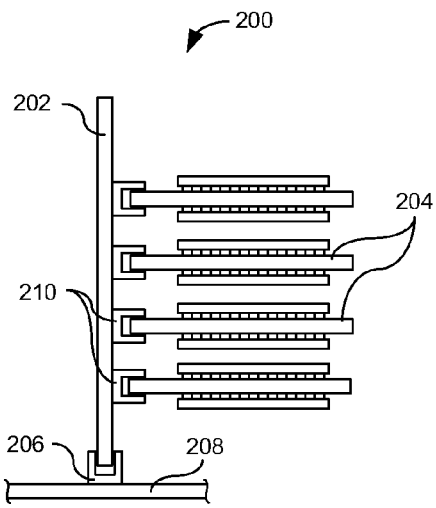
FIG. 2 illustrates a known memory riser card with electrical connections.

The example system 101 employs riser cards to hold the plurality of memory devices 108 to enable integrating the system 101 with other standard computer system components. FIG. 2 illustrates a known memory architecture 200 having a standard memory riser card 202 holding a plurality of Dual In-Line Memory Modules (DIMMs) 204. The riser card 202 of the illustrated example is inserted in an electrical riser connector 206 of a circuit board 208. The riser card 202 includes individual electrical DIMM connectors 210 to connect corresponding ones of the DIMMs 204 to the riser card 202. Accordingly, when the known memory architecture 200 is implemented, electrical signals from a memory connected to the circuit board 208 pass through the common riser connector 206 and then are fanned out to each DIMM 204 through the individual DIMM connectors 210. Similarly, electrical signals from each DIMM 204 pass through the corresponding DIMM connector 210 and then pass through the riser connector 206. Thus, every signal in and out of each DIMM 204 passes through two electrical connections (i.e., the riser connector 206 and the DIMM connector 210), thereby creating inherent bandwidth constraints. These concerns can be alleviated or reduced by incorporating an optical interconnect system as described herein.

Figure 3:
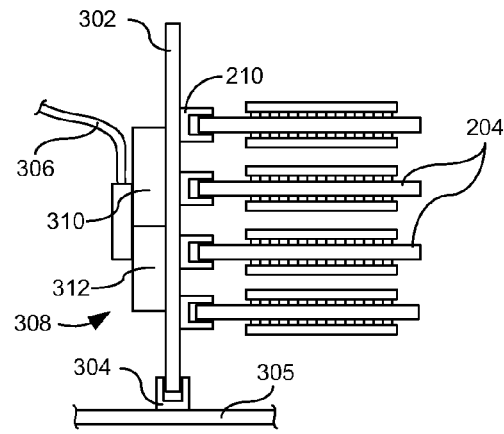
FIG. 3 illustrates an example memory riser card constructed in accordance with the teachings of the present disclosure.

FIG. 3 is an example memory riser card 302 constructed in accordance with the teachings of this disclosure. The example riser card 302 holds a plurality of DIMMs 204 in individual DIMM connectors 210. As with the known riser card 202 shown in FIG. 2, the memory riser card 302 of the illustrated example is inserted in an electrical riser connector 304 on a circuit board 305. However, the riser connector 304 in the illustrated example is used to provide power and low-speed control signals rather than the transmission of all signals to and from each DIMM 204. The example riser card 302 communicates with other components in a computer system via fiber optic cables 306 (e.g., carrying cables for input and/or cables for output) that connect to the riser card 302 via a memory fan-out buffer 308. In some examples, the memory fan-out buffer 308 provides detachable optical connections for each of the input and output ribbon fibers 306 to facilitate the connection and disconnection of components in a computer system.

In the illustrated example, the memory fan-out buffer 308 is associated with a transducer 310 that has optical to electrical (O/E) conversion capabilities to convert optical signals from the input fiber of the ribbon fiber 306 to electrical signals to be transmitted to the DIMMs 204. More particularly, in the illustrated example the optical signals are transmitted in high speed serial form and the buffer 308 via the transducer 310 converts the optical signals to low speed parallel electrical signals to be electrically fanned out to the DIMMs 204. Furthermore, the example memory fan-out buffer 308 of the illustrated example has fan-out drive capabilities when transmitting the input signals to drive two DIMMs 204 on each of two DIMM channels to increase bandwidth and decrease latency. In the illustrated example, the transducer 310 associated with the memory fan-out buffer 308 also has electrical to optical (E/O) conversion capabilities to convert electrical signals from the DIMMs 204 to optical signals to be transmitted via the output fiber of the ribbon fiber 306 to a memory controller as described more fully below.

In some examples, each memory fan-out buffer 308 includes and/or is in communication with a decoder 312. In the illustrated example, the decoder 312 determines whether a signal received via the fiber optic cables 306 is intended for one of the DIMMs 204 on the corresponding riser card 302 or whether the signal is intended for a DIMM 204 or other component on a separate riser card 302. Furthermore, if the received signal is intended for one of the DIMMs 204, the decoder 312 determines which of the DIMMs 204 and the particular memory location on the identified DIMM 204 as will be explained in greater detail below.

Figure 4A:
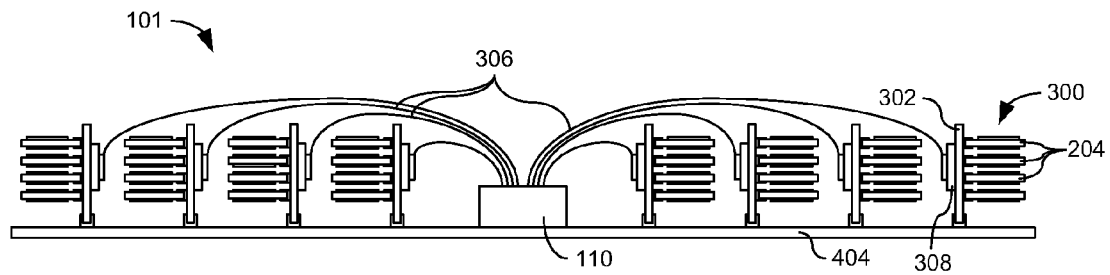
FIG. 4A is an isometric view of an example implementation of the example distribution system of FIG. 1B.

FIG. 4A is an isometric view of an example distribution system 101 of FIG. 1B. In the example of FIG. 4A, eight memory riser cards 302 as described above in connection with FIG. 3 are employed. As illustrated, the distribution system 101 of FIG. 4A is supported by a single optical distribution structure 110 connected to a memory controller (e.g., the memory controller 106 of FIG. 1B) via a circuit board 404. In the illustrated example, each of the eight riser cards 302 carries four DIMMs 204 for a total of thirty-two DIMMs in the distribution system 101. While the examples disclosed herein describe the distribution system 101 having eight memory riser cards 302, this is provided by way of example only and any suitable number of riser cards 302 with any suitable number of DIMMs 204 may instead by employed.

In the illustrated example, the distribution structure 110 routes communications between the DIMMs 204 and the memory controller 106. In some examples, the distribution structure 110 receives an input signal (e.g., the input signal 114) from the memory controller 106 and taps off (i.e., splits) power from the signal into eight tapped signals which are transmitted in the outbound direction to the memory riser cards 302. The eight outbound signals are transmitted via fiber optic cables 306 to corresponding ones of the memory fan-out buffers 308 associated with corresponding riser cards 302. As the distribution structure 110 fans out a signal to the memory fan-out buffers 308, the decoder(s) 312 serve to discriminate whether the signal(s) received at the respective fan-out buffer 308 are to be electrically transmitted on to the DIMMs 204 associated with the corresponding memory riser card 302 or whether the signal is to be ignored as being intended for DIMMs 204 associated with different riser cards 302. Furthermore, the decoders 312 determine which DIMM 204 on which riser card 302 is to receive and/or respond to the signals received from the memory controller 106. The buffers 308 of the illustrated examples may implement any appropriate method to discriminate between signals received from the memory controller 106. For example, the signals being transmitted to each buffer 308 may contain multiple bits, some of which are address bits. In other examples, the interconnects 102 carry a bit stream of address, command, and/or data bits that are discerned via a header portion of the signals, where the command bits indicate, for example, if data is to be stored or returned.

As stated above, in some examples, each fiber optic ribbon 306 includes an array of optical fibers to carry a multi-bit optical signal. For clarity, the examples disclosed herein describe a 12-bit signal. However, the example distribution structure 110 can be adapted to transmit any suitable number of bits in a signal between components. In some examples, the initial 12-bit optical input signal is produced from a single 1×12 vertical-cavity surface-emitting laser (VCSEL) array (see FIG. 5C) connecting the memory controller 106 to the distribution structure 110. However, any other suitable optical transmitter (e.g., a distributed feedback (DFB) laser, a quantum well laser, a multiple quantum well laser, a double heterostructure laser, a light-emitting diode (LED), etc.) may be implemented to produce the optical signals transmitted over the interconnects 102.

The distribution structure 110 of the illustrated example also has fan-in capabilities. In some examples, the distribution structure 110 fans-in 12-bit signals from each of the eight riser cards 302 to be received by a single 1×12 photo-detector (see FIG. 5C) providing the electrical to optical conversion between the distribution structure 110 and the memory controller 106. The photo-detector in the illustrated example can be p-n or p-i-n junction photodiodes, or n-p-n or p-n-p phototransistors.

The optical distribution structure 110 of the illustrated example is formed from two optical distribution matrices (e.g., the example distribution matrices 112 of FIG. 1B). A first distribution matrix 112 is for outbound signals (e.g., processor to memory) and a second distribution matrix 112 is for inbound signals (e.g., memory to processor). In the illustrated examples, the first inbound matrix 112 and the second outbound matrix 112 are structurally the same and differ primarily in terms of the direction of the optical signals passing through each. Accordingly, as used herein the term "distribution matrix" applies to both the outbound and inbound matrices.

Figure 4B:
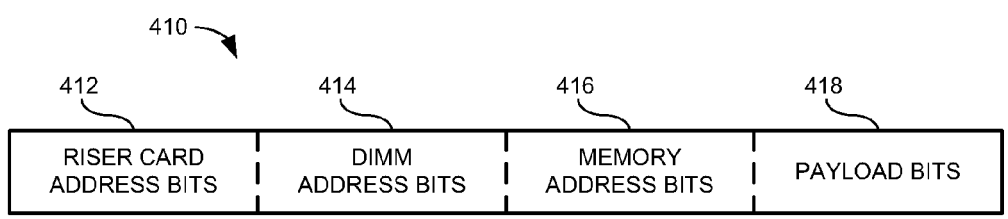
FIG. 4B illustrates an example message for adding data to a DIMM in the example of FIG. 4A.

FIG. 4B illustrates an example message 410 for adding data to a DIMM in the example of FIG. 4A. As stated above, in some examples the signals being transmitted to each riser card 302 may contain multiple bits, some of which are address bits. In some such examples the upper address bits identify the intended recipient riser card 302 (e.g., riser card address bits 412) while the lower address bits identify the particular DIMM 204 on the identified riser card 302 (e.g., DIMM address bits 414) and the particular memory location(s) within the identified DIMM 204 (e.g., memory address bits 416). Further, in some such examples, the remaining bits of the message 410 include payload bits 418 to be stored within the identified memory location.

Figure 5A:
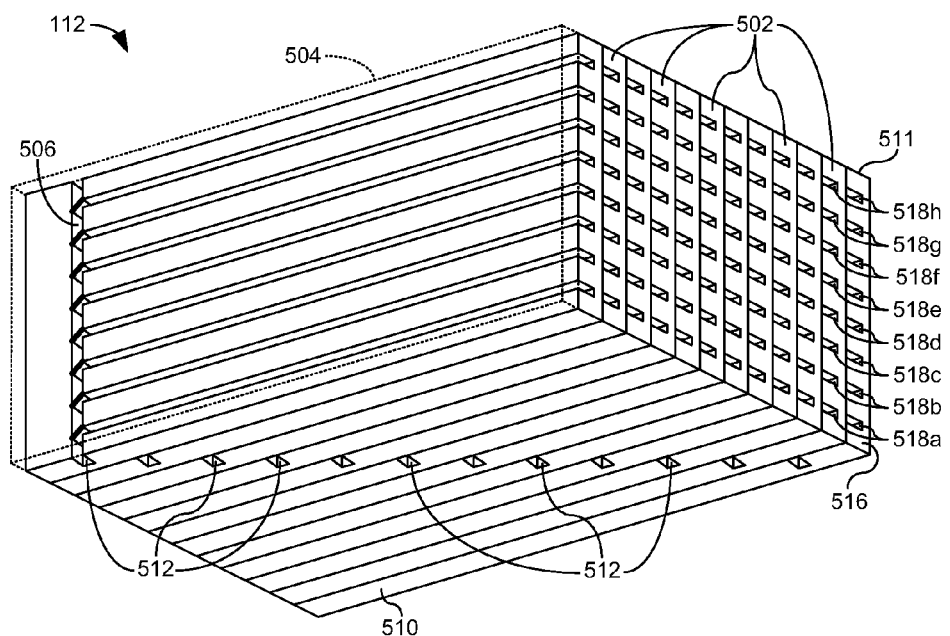
FIG. 5A illustrates an example implementation of the optical distribution matrix of the example distribution structure shown in FIGS. 1B and 4A.

FIG. 5A is an example implementation of either of the optical distribution matrices 112 of FIG. 1B. The optical distribution matrix 112 of the illustrated examples is formed from twelve bit slices 502 and a cap slice 504 (shown with dotted lines) laminated together. While twelve bit slices 502 are shown, any number of bit slices 502 may be incorporated into the example distribution matrix 112. In the illustrated examples, each of the twelve bit slices 502 corresponds to one bit of a 12-bit optical signal.

Figure 5B:
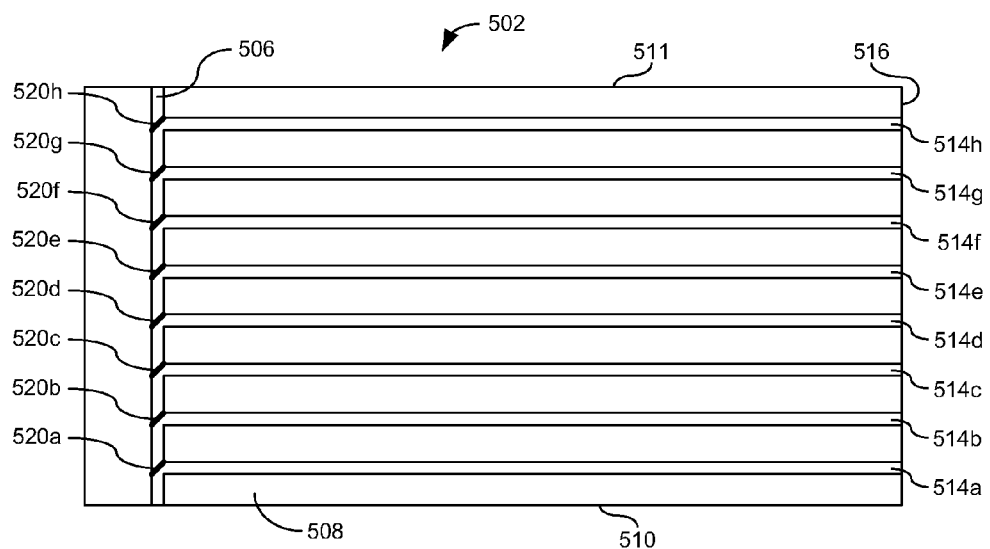
FIG. 5B is a front view of an example slice of the example optical distribution matrix shown in FIG. 5A.

FIG. 5B is a front view of any one of the example bit slices 502 of the distribution matrix 112 of FIG. 5A. In the illustrated example, the bit slice 502 contains a primary groove, spline, or channel 506 formed in a front surface 508 of the bit slice 502 to serve as boundaries or walls of a hollow metal waveguide to transmit the corresponding bit of the 12-bit optical signal associated with the bit slice 502. As the channel 506 is open on the front surface 508, the walls of the hollow metal waveguide for the bit slice 502 of the illustrated example is completed by enclosing the channels 506 on the front surface 508 with the backside of an adjacent bit slice 502 when the bit slices 502 are laminated together to form the distribution matrix 112 (see FIG. 5A). The primary channel 506 of the front most bit slice 502 in the illustrated example is enclosed with a cap slice 504 as shown with dotted lines in FIG. 5A. In some examples, the primary channel 506 of each bit slice 502 begins from a bottom surface 510 of the bit slice 502 and substantially extends across the front surface of the bit slice 502 to an opposite top surface 511. As a result, when the example bit slices 502 are laminated together, the primary channels 506 form corresponding openings or ports 512 at the bottom surface 510 to serve as input points of an input signal received from the memory controller 106 or as output points for an output signal passing through the distribution matrix 112 to the memory controller 106. In the example of FIG. 5A, the primary channels 506 of the bit slices 502 are staggered as shown by the location of the ports 512 in FIG. 5A.

In addition to the primary channels 506, each bit slice 502 of the illustrated example has eight secondary channels 514a-h. The secondary channels 514a-h are in optical communication with the corresponding primary channel 506 and extend from the primary channel 506 to an end 516 of the bit slice 502. As a result, when the example bit slices 502 are laminated, the secondary channels 514a-h form corresponding openings or ports 518a-h at the ends 516 to serve as output points of outbound signals or as input points for inbound signals passing through the distribution matrix 112.

The secondary channels 514a-h of the illustrated example are hollow metal waveguides that branch off their respective primary channel 506 to carry different portions of a signal passing through the distribution matrix 112. Although the illustrated examples show the primary and secondary channels 506 and 514a-h having substantially rectangular cross-sections, any suitable cross-section may be employed to propagate the signals through the distribution matrix 112.

As discussed previously in connection with FIGS. 1A and 1B, optical signals are transmitted along the interconnects 102 and guided to each computer system component via the optical taps 104. While the optical taps 104 may be implemented in a number of ways, in the illustrated examples, the optical taps 104 are implemented with variable reflectivity pellicle mirrors 520a-h. Each such mirror 520a-h reflects a portion of an optical signal and transmits the remaining portion through the mirror 520a-h. In this manner, a single inbound signal can be transmitted through the primary channel 506 with a portion of the signal being tapped off or deflected into each of the secondary channels 514a-h. The proportion of light reflected versus the proportion transmitted by each mirror 520a-h depends upon the optical characteristics of each mirror 520a-h as will be explained in greater detail below in connection with FIG. 7.

Figure 5C:
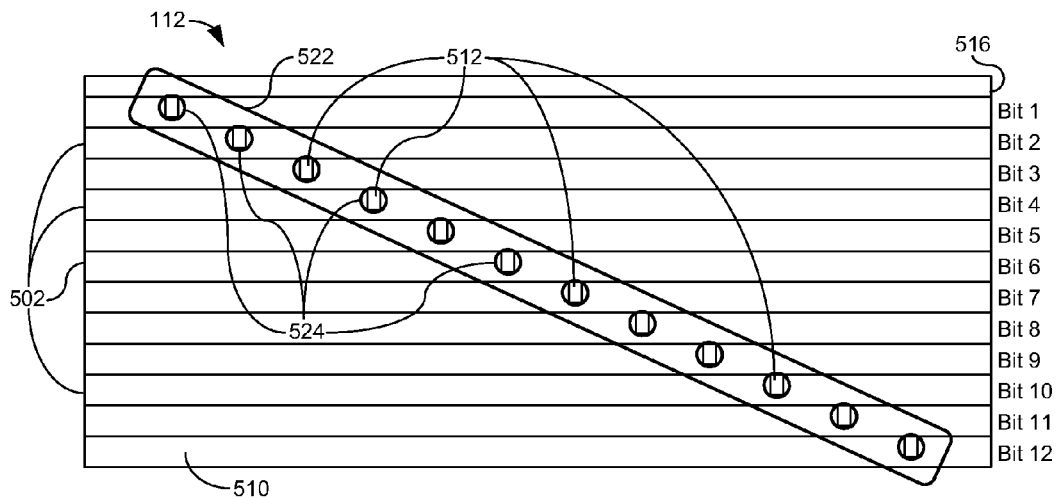
FIG. 5C is a bottom view of the example optical distribution matrix shown in FIG. 5A showing the connection of a VCSEL array or a photo-detector array.

FIG. 5C is a bottom view of the example optical distribution matrix 112 shown in FIG. 5A while showing the connection of a 1×12 VCSEL array or a 1×12 array of photo-detectors represented by the outline 522. In the illustrated example, each of the bit slices 502 has substantially the same (e.g., identical) structure except that the primary channel 506 (and therefore each corresponding port 512) of each bit slice 502 is located a different distance from the end 516 of the corresponding bit slice 502. In the example shown in FIG. 5C, the different distances of the channels 506 cause the ports 512 to be spaced in linear alignment along the bottom surface 510 of the distribution matrix 112. In the illustrated example, the locations of the ports 512 are selected to align with lasers (represented in FIG. 5C by the circles 524) of the 1×12 VCSEL array 522. Because the lasers 524 of the VCSEL array 522 of the illustrated example align with the ports 512 of the distribution matrix 112, the bits of a 12-bit input signal may be transmitted through respective ones of the bit slices 502 simultaneously. Alternatively, the distribution matrix 112 of the illustrated example may connect to a 1×12 photo-detector array instead of the VCSEL array such that the outline 522 corresponds to the photo-detector array having and the circles 524 correspond to individual receivers of the photo-detector 522 to simultaneously receive the 12 bits of a 12-bit inbound signal via respective ones of the bit slices 502. The photo-detector or VCSEL array 522 may be connected to the corresponding distribution matrix 112 via any suitable method including, for example, inserting ends of fibers leading to the photo-detectors or VCSELs into the ports 512 of the distribution matrix 112. In other examples, the photo-detectors and/or the VCSELS may be physically integrated in the distribution matrix 112 during the manufacturing or assembly process.

Figure 5D:
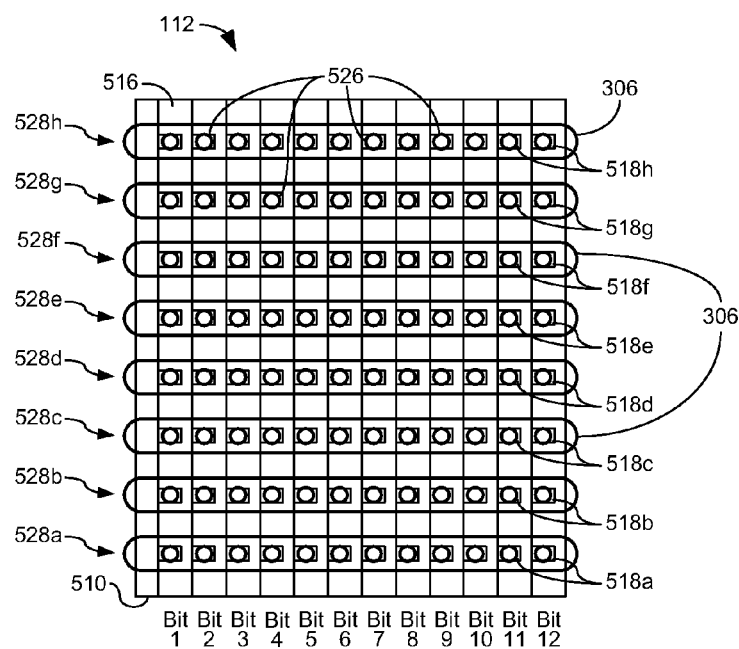
FIG. 5D is an end view of the example optical distribution matrix shown in FIG. 5A showing the connections of fiber optic cables shown in FIG. 4A.

FIG. 5D is an end view of the example distribution matrix 112 of FIG. 5A showing the connections of ribbon fibers 306 to the end 516 of the distribution matrix 112. In the illustrated examples, the secondary channels 514a-h (and therefore each corresponding port 518a-h) of each bit slice 502 are located the same distance from the bottom 510 as respective secondary channels 514a-h (and corresponding ports 518a-h) of every other bit slice 502 to form corresponding rows 528a-h of ports 518a-h. In this manner, respective ones of the ribbon fibers 306 in the illustrated example align with a set of the ports 518a-h in each of the corresponding rows 528a-h. As illustrated in FIG. 5D, individual fibers 526 of each ribbon fiber 306 align with respective ports 518a-h within each corresponding row 528a-h. Furthermore, the secondary channels 514a-h of the illustrated example have approximately the same width as the individual fibers 526, thereby enabling the ends of the individual fibers 526 to be inserted in the ports 518a-h and held in place with a friction fit or glue. Other methods of attaching the ribbon fibers 306 in the illustrated examples may also be implemented such as, for example, by employing MT-styled ferrules. In the illustrated examples, each row 528a-h, and therefore each ribbon fiber 306, corresponds to one tapped portion of a complete 12-bit signal passing through the distribution matrix 112. In this manner, each of the ribbon fibers 306 of the illustrated example carries a corresponding outbound signal as shown in FIG. 4A. Additionally or alternatively, each of the ribbon fibers 306 of the illustrated example may transmit inbound signals to the distribution matrix 112 to be received by the photo-detector array described above in connection with FIG. 5C.

Figure 6A:
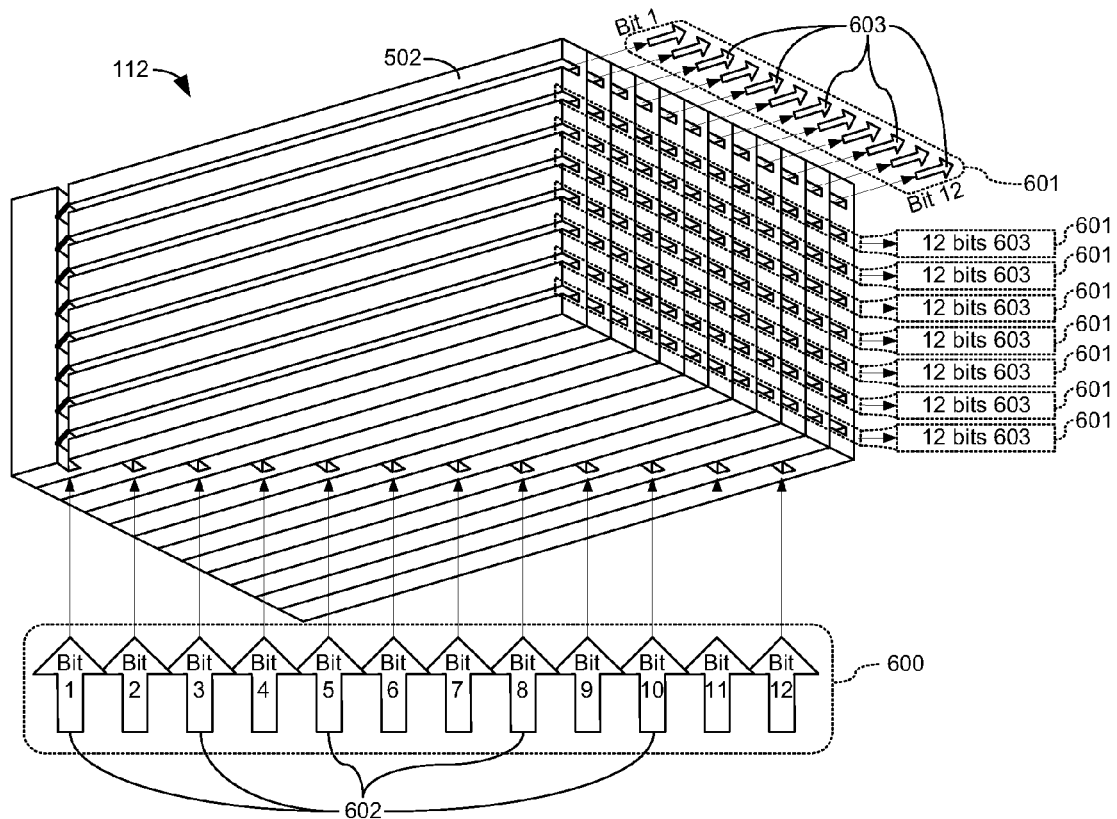
FIG. 6A illustrates an example path of an example multi-bit optical input signal through the example distribution matrix of FIG. 5A.
Figure 6B:
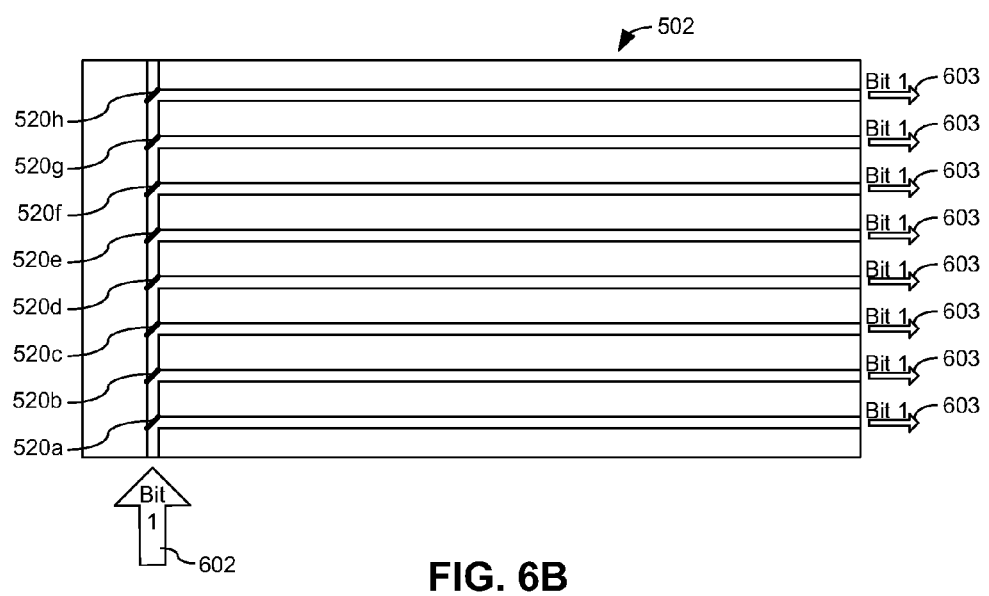
FIG. 6B illustrate an example path of a single bit of the example input signal of FIG. 6A passing through the example bit slice of FIG. 5B.

FIGS. 6A-6D illustrate the paths of example signals passing through the example distribution matrix 112 shown in FIG. 5A. For the sake of clarity, the cap slice 504 of the example distribution matrix 112 shown in FIG. 5A has been omitted in FIGS. 6A and 6C. The illustrated example of FIG. 6A shows a multi-bit input signal 600, produced by, for example, a 1×12 VCSEL array, having twelve bits 602 entering the distribution matrix 112 via the ports 512 and fanning out to eight outbound signals 601 each having twelve bits 603. Each of the outbound signals 601 are described with the same reference numeral and same bits 603 because each outbound signal 601 is merely a tapped portion of the initial input signal 600 and is, therefore, substantially similar (e.g., identical) to every other outbound signal 601. In the same manner, FIG. 6B shows the first bit 602 of the input signal 600 entering the front most slice 502 of the distribution matrix 112 shown in FIG. 6A fanning out to the first bits 603 of each of the outbound signals 601. In the illustrated example, after the outbound signals 601 fan out, the outbound signals 601 leave the distribution matrix 112 via the rows 528a-h of ports 518a-h corresponding to each of the ribbon fibers 306 shown in FIG. 5D.

Although each of the outbound signals 601 has the same bits 603 as the bits 602 of the input signal 600, the power of the outbound signals 601 is lower than the input signal 600 because each of the outbound signals 601 include only a portion of the input signal 600. Although not to scale, the power of each bit 602 of the input signal 600 entering the distribution matrix 112 relative to the power of each bit 603 of the outbound signals 601 leaving the distribution matrix 112 is demonstrated in FIG. 6A by the size of arrows representing the bits 602 of the input signal 600 relative to the size of arrows representing the bits 603 of the outbound signals 601. The power of the input signal 600 in the illustrated example is greater than the power of the outbound signals 601 because the outbound signals 601 have been split off the input signal 600 via the mirrors 520a-h. Furthermore, as shown in the example illustration, each bit 602 of the input signal 600 has approximately the same power as every other bit 602 of the input signal 600. Similarly, each bit 603 of the top most outbound signal 601 (corresponding to the top most row 528h of FIG. 5D) is shown having approximately the same power as every other bit 603 of the top most outbound signal 601. For the sake of clarity, arrows representing the individual bits 603 of the remaining outbound signals 601 in the illustrated example have been omitted.

Figure 6C:
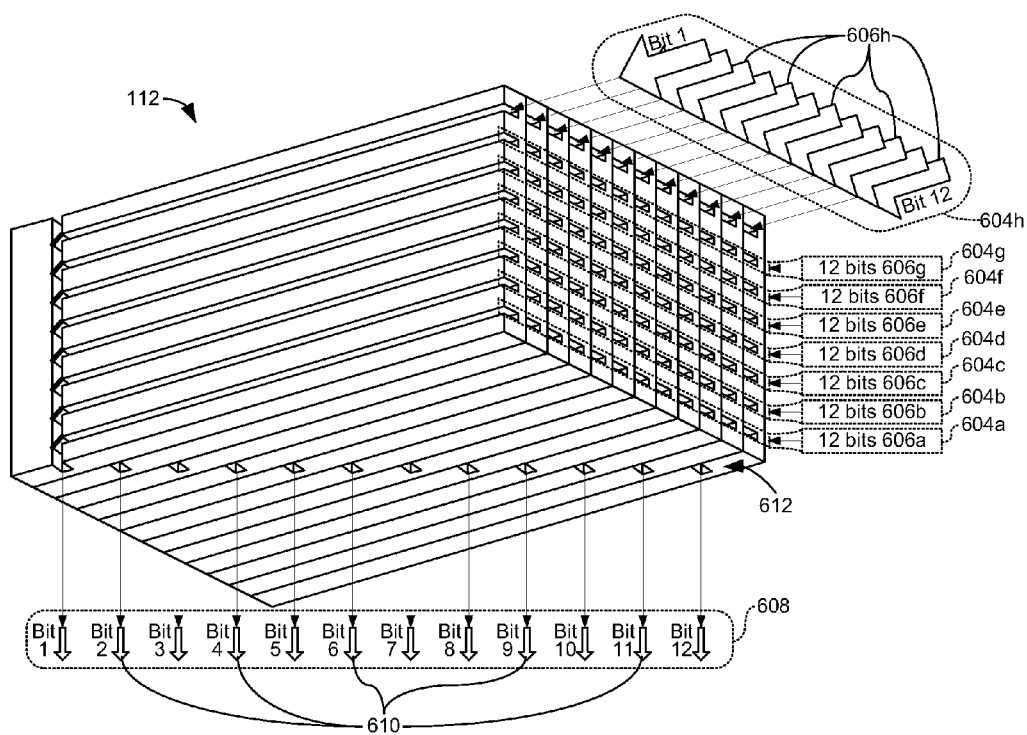
FIG. 6C illustrates an example path of example multi-bit inbound optical signals passing through the distribution matrix of FIG. 5A.
Figure 6D:
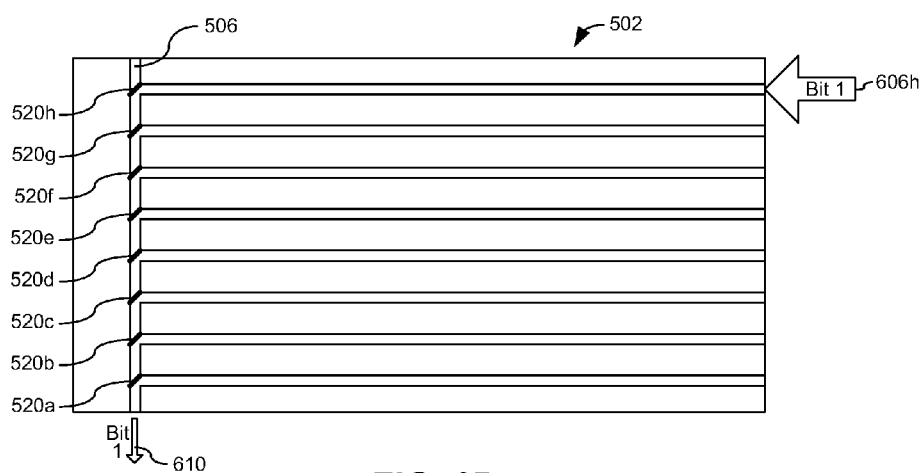
FIG. 6D illustrates an example path of a single bit of the example inbound signal of FIG. 6C passing through the example bit slice of FIG. 5B.

FIG. 6C illustrates eight example multi-bit inbound signals 604a-h each having twelve respective bits 606a-h (i.e., the inbound signal 604a has twelve bits 606a, the inbound signal 604b has twelve bits 606b, and so forth) entering the distribution matrix 112 via the corresponding rows 528a-h of the ports 518a-h and fanning in to exit as one output signal 608 having twelve bits 610 at a 12-bit output 612 defined by the ports 512 of the distribution matrix as discussed in FIG. 5A. In the illustrated example, each of the inbound signals 604a-h originates from different ones of the riser cards 302 as shown in FIG. 4A. Therefore, unlike the outgoing outbound signals 601 described in FIGS. 6A and 6B that are similar to each other, each inbound signal 604a-h of the illustrated example may be different from every other inbound signal 604a-h. Accordingly, the inbound signals 604a-h do not pass through the distribution matrix 112 at the same time, which may result in the signals 604a-h constructively and/or destructively combining. Rather, transmission occurs separately for each of the inbound signals 604a-h as controlled by the memory controller 106 through any appropriate addressing or multiplexing scheme as described above. Thus, as used herein, fanning-in the inbound signals 604a-h means that each of the inbound signals are directed through the distribution matrix 112 to exit via the same ports 512, but not at the same time. In other words, the output signal 608 is not a combination of separate inbound signals 604a-h, but corresponds to any one of the inbound signals 604a-h that is being transmitted at any particular moment such that each of the signals 604a-h can be received by a single 1×12 photo-detector array as described in FIG. 5C. To further illustrate, FIG. 6D shows an example entry and exit path of a single bit 606h of the example inbound signal 604h of FIG. 6C passing through the example bit slice 502 of FIG. 5B to leave as the first bit 610 of the output signal 608. At another point in time, a different bit (e.g., 606a-g) corresponding to a different inbound signal (e.g., 604a-g) of the illustrated example may pass through the slice 502 and exit as the first bit 610 of the output signal 608.

While the signals 604a-h of the illustrated example may be different from each other, the power of each is approximately equivalent when entering the distribution matrix 112. Furthermore, due to the optical characteristics of the mirrors 520a-h in each of the example bit slices 502, the output signal 608 in the illustrated has approximately the same power at any given moment regardless of which inbound signal 604a-h is the source for the output signal 608 at that moment. Although not to scale, the power of each bit 606a-h of each corresponding inbound signal 604a-h entering the distribution matrix 112 relative to the power of each bit 610 of the output signal 608 leaving the distribution matrix 112 is demonstrated in FIGS. 6C and 6D by the size of arrows representing the bits 606a-h of the corresponding inbound signal 604a-h relative to the size of arrows representing the bits 610 of the output signal 608. As illustrated, the power of each bit 606a-h of each corresponding inbound signal 604a-h is greater than the power of each bit 610 of the output signal 608 because the inbound signals 604a-h pass the mirrors 520a-h that either reflect or transmit only a portion of the power of the signal along the primary channel 506 towards the output 612. Furthermore, the power of each bit 610 of the output signal 608 is approximately the same as the power of every other bit 610 of the output signal 608. For the sake of clarity, arrows representing the individual bits 606h of the inbound signal 604h only are shown, however, corresponding bits 606a-g of each corresponding inbound signal 604a-g of the illustrated example have approximately the same power as the bits 606h of the inbound signal 604h.

Figure 7:
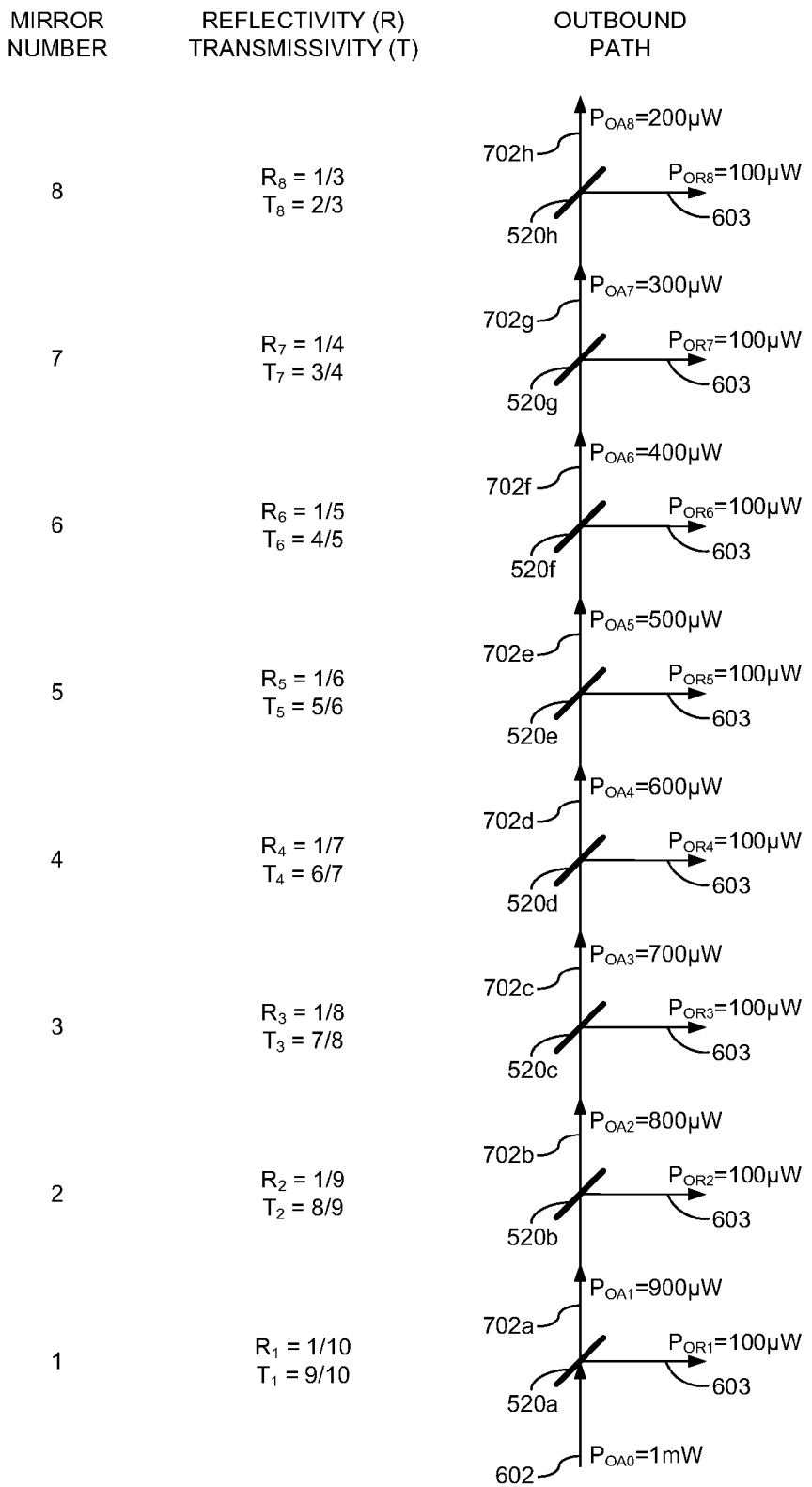
FIG. 7 is an illustration of an example optical power distribution of the bits of an example input signal passing through the example bit slice shown in FIG. 5B.

FIG. 7 illustrates an example power distribution of the first bit 602 of the input signal 600 passing through the example bit slice 502 shown in FIG. 5B. Although the illustrated example shows the power distribution of the first bit 602, the optical power distribution of every other bit 602 of the input signal 600 is similar to (e.g., the same as) the first bit 602. FIG. 7 depicts an exemplary power distribution for the listed power ratios of reflectivity and transmissivity for the eight mirrors 520a-h. As used herein, when a mirror 520a-h of an example is said to remove the same amount of power as another mirror 520a-h, for example 100 microwatts (μW), there may be mirror variation from the 100 (μW) that are within acceptable tolerance levels as determined by the link budget. Furthermore, in the illustrated example, 100 μW is used illustratively as the power (e.g., a minimum power level) needed to maintain a reliable communication link.

In the illustrated example, the first bit 602 of the input signal 600 has an initial transmitted power denoted by $P_{OA0}$ equal to 1 milliwatt (mW) of optical energy as it enters the primary channel 506 of the bit slice 502 shown in FIG. 6B. The subscript 'OA' signifies 'outbound advancing' to describe the outbound direction of the signal 600 and that the corresponding portion of the signal 600 is advancing along the primary channel 506 rather than being deflected elsewhere. When the bit 602 reaches the first mirror 520a, with reflectivity of $R_1=1/10$ and a transmissivity of $T_1=9/10$, the first mirror 520a reflects a portion of the power of the bit 602 down the first secondary channel 514a (i.e., the first bit 603 of the first outbound signal 601). The power of the reflected or tapped bit 603 in the outbound direction is denoted as a variable $P_{OR1}=P_{OA0}R_1$. Accordingly, the power of the tapped bit 603 is 100 μW (1 mW×1/10). The first mirror 520a also transmits a first advancing signal 702a in the outbound direction further along the primary channel 506. The first advancing signal 702a in the illustrated example corresponds to the remaining power of the bit 602 of the input signal 600 with a power of $P_{OA1}=900$ μW, where $P_{OA1}=P_{OA0}T_1$. Thus, the first advancing signal 702a represents the input signal 602 passed through the first mirror 520a with a power loss of 100 μW.

The first advancing signal 702a continues along the primary channel 506 until it reaches the second mirror 520b where the signal 702a is split according to the power ratios of reflectivity and transmissivity of the second mirror 520b. In the illustrated example, the reflectivity ($R_2$) of the second mirror 520b equals 1/9 and the transmissivity ($T_2$) equals 8/9. Accordingly, the mirror 520b reflects a portion of the first advancing signal 702a (having a power $P_{OA1}=900$ μW) down the second secondary channel 514b as the second tapped bit 603 with a power of $P_{OA2}=100$ μW, where $P_{OR2}=P_{OA1}R_2$. The remaining portion of the first advancing signal 702a is transmitted through the mirror 520b to produce a second advancing signal 702b in the outbound direction having a power of $P_{OA2}800$ μW, where $P_{OA2}=P_{OA1}T_2$. Thus, the second advancing signal 702b represents the bit 602 of input signal 600 from the memory controller 106 passed through the first and second mirrors 520a-b with a power loss of 200 μW.

The third, fourth, fifth, sixth, seventh, and eighth mirrors 520c-h function by splitting the immediately preceding advancing signals 702b-g into respective reflected or outbound bits 603 with the remaining portion of the signal being transmitted through the corresponding mirror 520c-h as the next advancing signal 702c-h. The power ratios of reflectivity to transmissivity of each successive mirror 520c-h in the illustrated example is such that the bits 603 of each corresponding outbound signal 601 reflected by each corresponding mirror 520c-h has approximately the same power of 100 μW and each successive advancing signal 702c-h has the power of the previous advancing signal 702b-g with a power loss corresponding to the power reflected by the respective mirror 520c-h (i.e., reduced by approximately 100 μW). Accordingly, in the illustrated example, the power of any of the bits 603 leaving the distribution matrix 112 via any of the secondary channels 514a-h of a given slice is denoted generally by $P_{ORn}=P_{OAn-1}R_n$, where n is the mirror number corresponding to the mirror 520a-h reflecting the associated bit 603. The power of each successive advancing signal 702a-h in the illustrated example is denoted generally by $P_{OAn}=P_{OAn-1}T_n$. In the illustrated example, after the eighth bit 603 is reflected off the eighth mirror 520h, the eighth advancing signal 702h has a power of 200 μW. Thus, the eighth advancing signal 702h represents the bit 602 of the input signal 600 from the memory controller 106 passed through the channel 506 with a power loss of 800 μW.

No mirror (e.g., the mirrors 520a-h) is perfectly efficient. Rather, the mirrors 520a-h of the illustrated example have the optical characteristics of $P_{OAn-1}=P_{ORn}+P_{OAn}+$Loss. The "Loss" may include optical loss from the corresponding mirror 520a-h and/or from the optical path the optical signal is travelling through. Ideally, the loss should be kept as small as possible such that $R_n+T_n$ equals approximately 1. In the foregoing example, the loss was excluded for purposes of clarity in this disclosure.

The 200 μW of power in the eighth advancing signal 702h in the illustrated example does not actually advance to any additional mirrors but is extra power implying that more mirrors (and more memory devices connected to those mirrors) may be included if desired. Alternatively, the power of each of the tapped bits 603 in the illustrated example could be increased by adjusting the power ratios of each mirror 520a-h so as to divide the extra 200 μW among each reflected portion such that the eighth advancing signal 702h is approximately zero and virtually all power from the initial input signal 600 goes into the outbound signals 601. As another alternative, the extra 200 μW in the illustrated example allows for the reduction of energy of the initial input signal 600 by 200 μW and then adjusting the power ratios of the mirrors 520a-h such that each reflects the same amount of power as the example above (e.g., 100 μW) but with little or no power left for an eighth advancing signal 702h. In this manner, satisfying a communication reliability metric where each signal 601 has approximately equal power may be achieved while reducing (e.g., minimizing) power consumption.

Furthermore, the optical characteristics of the mirrors 520a-h described above also enable the bits of an output signal (e.g., bits 610 of the output signal 608 shown in FIGS. 6A and 6B) to have approximately the same amount of power (e.g., 100 μW) when any one of the bits 606a-h of the corresponding inbound signals 604a-h having the same initial power (e.g., 1 mW) is transmitted through the distribution matrix 112 in the opposite direction. Accordingly, the illustrated example enables the initial power of all inbound and outbound signals to be approximately the same (e.g., 1 mW) and the resulting power of each signal after passing through the distribution matrix 112 to also be approximately the same (e.g., 100 μW).

Figure 8:
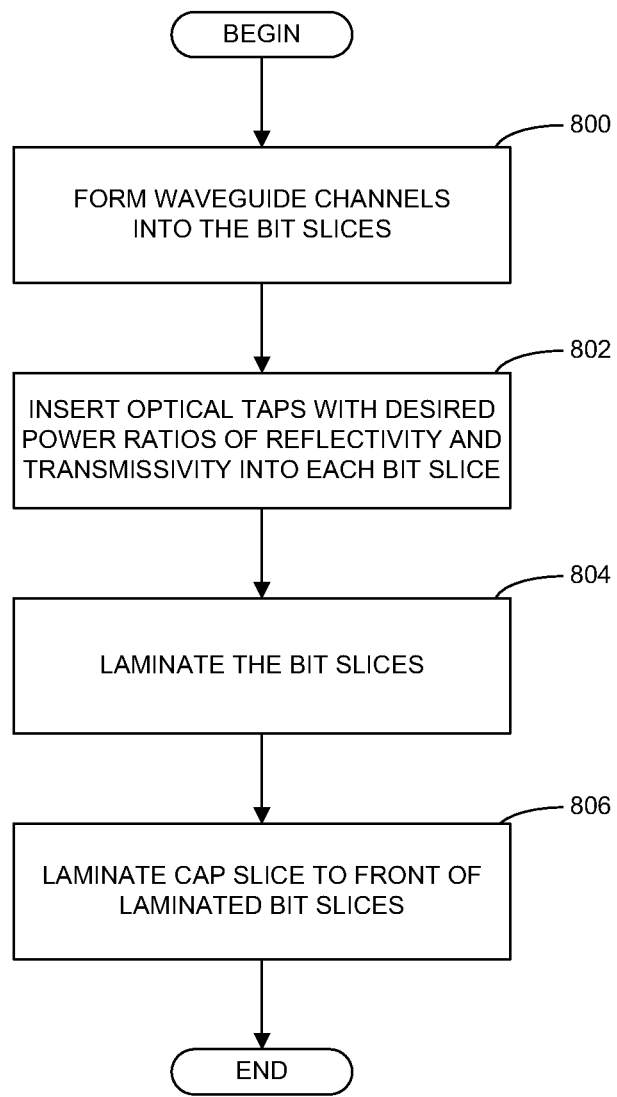
FIG. 8 is a flow chart diagram illustrating an example method of manufacturing the example optical distribution matrix of FIG. 5A.

FIG. 8 is a flow diagram illustrating an example method to manufacture the example optical distribution matrix 112 of FIG. 5A. Although the example method is described with reference to the flow diagram of FIG. 8 and FIGS. 5A and 5B, other processes of implementing the example method may be used. For example, the order of execution of the blocks may be changed, and/or some of the blocks described may be changed, eliminated, sub-divided, or combined. Additionally, the example method of FIG. 8 may be performed sequentially and/or concurrently.

Initially, the example method of FIG. 8 begins by forming waveguide channels (e.g., the primary and secondary channels 506 and 514a-h of FIG. 5B) into each of a plurality of bit slices (e.g., the twelve bit slices 502 of FIG. 5A) (block 800). The waveguide channels of the example method are formed into a front face of each bit slice (e.g., the front face 508 of each bit slice 502) and may have any suitable cross-sectional shape and/or position. A number of methods (e.g., etching, grounding, polishing, etc.) may be implemented to form the waveguide channels, which may depend upon the material of the bit slices. The bit slices may be made of any suitable material such as glass, plastic, silicon, etc. In some examples, the waveguide channels are formed using an etching process. In other examples, the bit slices including the waveguide channels are formed concurrently via an injection molding process. Once the waveguide channels are formed, they are metalized to function as hollow metal waveguides.

Next, optical taps (e.g., the mirrors 520a-h of FIG. 5B) with desired reflectivity and transmissivity power ratios are inserted into each bit slice (block 802). In particular, the optical taps are inserted at the intersections of the waveguide channels of each bit slice to reflect and/or transmit optical signals between the channels of each bit slice in either the inbound or outbound direction. To position the optical taps to achieve a desired angle of reflected and transmitted light, fitted openings may be etched into each bit slice through a lithographic process to securely hold each optical tap in place. For example, in the illustrated example of FIG. 5B, narrow slits just wide enough to hold the pellicle mirrors 520a-h are created in each bit slice 502 at the desired location and angle, and then the mirrors 520a-h are inserted. In this manner, the angle of the mirrors 520a-h is established without the need to adjust the mirrors 520a-h once installed. Accordingly, there are no moving parts in the distribution matrix 112.

With the optical taps inserted into each bit slice, the bit slices are laminated together (block 804). In particular, the bit slices are laminated such that the waveguide channels of each bit slice are positioned relative to the corresponding waveguide channels of every other bit slice to align with input and output optical components (e.g., the line of ports 512 to align with the 1×12 photo-detector or VCSEL array shown in FIG. 5C or the rows 528a-h of corresponding ports 518a-h to align with the ribbon fibers 306 shown in FIG. 5D). Furthermore, the bit slices are laminated such that the front of each bit slice faces the backside of an adjacent bit slice to enclose the waveguide channels and enable them to function as hollow metal waveguides. However, the waveguide channels of the front most bit slice in the example method remains open because there is no adjacent bit slice to cover its front. Accordingly, a cap slice (e.g. the cap slice 504 of FIG. 5A) is laminated to the front of the laminated bit slices (block 806). In this manner, the waveguide channels of each bit slice are enclosed except at the end points corresponding to input ports and output ports (e.g., the ports 512 in the bottom of each bit slice 502 and the ports 518a-h in the end 516 of each bit slice 502).

From the foregoing, it will be appreciated that the above disclosed methods and apparatus enable a large number of DIMMs (or other I/O devices) to be supported by a single optical distribution architecture. In this manner, the problems of known optical communication systems that are bulky and require custom designed parts is alleviated. For example, while many known optical communication systems span inches between components (e.g., DIMMs), resulting in power loss due to deflection, examples disclosed herein implement an architecture having a very small form factor. Similarly, unlike the bulky and rigid form factors of known optical communication systems that may require custom built components, the flexible nature of the ribbon fibers 306 enable the ready integration of the disclosed examples in standard computer systems. Furthermore, illustrated examples are highly serviceable by enabling the replacement of riser cards 302 and/or individual DIMMs 204 on the riser cards 302, thereby increasing the useful life of the system employing such cards 302 or DIMMs 204.

Additionally, the above disclosed methods and apparatus can reduce the total optical component count while supporting the same number of DIMMs (or other I/O devices). For example, a prior art system designed to connect 12 optical bits in each direction to thirty-two DIMMs with O/E and E/O conversion capabilities would require 384 outbound paths (12 bits×32 DIMMs) and 384 inbound paths (12 bits×32 DIMMs) for a total of 768 total paths. Inasmuch as each path requires an optical transmitter (e.g., a VCSEL) and a receiver (e.g., photo-detector) at opposite ends, the total optical component count for such a system is 1536 devices (768 paths×2). However, using the above disclosed methods and apparatus can greatly reduce this number. For example, using the optical riser cards 302 described above reduces the total optical count by a factor of four because each riser card 302 holds four DIMMs and the connection point is at the riser card level rather than the DIMM level. Thus, there are 96 outbound paths (12 bits×8 riser cards) and the 96 inbound paths (12 bits×8 riser cards) for a total of 192 paths in the illustrated examples. With an optical transmitter and receiver at either end, the total number of optical devices employed becomes 384 (192 paths×2). Additionally, by fanning out the input signal eight ways via the optical distribution structure 110, the number can be further reduced. Although there are the same number of paths (i.e., 192), the 1:8 fan-out in the illustrated examples spreads the power of active elements over more channels such that 12 optical transmitters (e.g., a single 1×12 VCSEL array) can drive all 96 outbound paths (12 bits×8 channels). Likewise, the 1:8 fan-in enables 12 receivers (e.g., a single 1×12 photo-detector) to receive all 96 inbound paths. In this manner, there are only 108 optical components for the outbound paths (12 optical transmitters+96 receivers) and 108 optical components for the inbound paths (12 receivers+96 optical transmitters) for a total of 216 optical devices. Thus, the illustrated examples reduce the optical component count for a 32 DIMM memory system relative to the above example prior art system from 1536 devices down to 216 devices.

Although certain example methods and apparatus have been described herein, the scope of coverage of this patent is not limited thereto. On the contrary, this patent covers all methods, apparatus and articles of manufacture fairly falling within the scope of the claims of this patent.

What is claimed is:

1. An optical architecture comprising:
   first and second riser cards;
   first and second components carried by the first and second riser cards respectively;
   a first matrix to fan-out a multi-bit optical input signal into first and second outbound signals; and
   first and second fiber optic cables to carry the first and second outbound signals to the first and second riser cards, respectively, wherein the first and second fiber optic cables communicate respective inbound signals from corresponding ones of the first and second risers cards to the first matrix, the first matrix to convert at least one of the inbound signals into a multi-bit output signal.

2. The optical architecture as described in claim 1, further comprising first and second transducers in communication with respective ones of the first and second fiber optic cables and respective ones of the first and second riser cards, the first and second transducers to convert the respective first and second outbound signals from optical signals to electrical signals.

3. The optical architecture as described in claim 2, further comprising decoders in communication with respective ones of the first and second transducers to determine whether the respective outbound signals are intended to be communicated to corresponding ones of the first and second components.

4. The optical architecture as described in claim 1, further comprising a vertical cavity surface emitting laser (VCSEL) to produce the multi-bit optical input signal.

5. The optical architecture as described in claim 1, further comprising a photo-detector in communication with the first matrix to receive the multi-bit output signal.

6. The optical architecture as described in claim 1, wherein the first outbound signal and the second outbound signal comprise a same optical power.

7. The optical architecture as described in claim 1, further comprising:
   a memory controller to provide an addressing signal to one of the first riser card or the second riser card to authorize the one of the first riser card or the second riser card to communicate one of the respective inbound signals.

8. The optical architecture as described in claim 1, wherein first and second components of the first and second riser cards store redundant data, wherein the respective inbound signals comprise the redundant data, and wherein the respective inbound signals are communicated in a same time period.

9. The optical architecture as described in claim 1, wherein the first matrix includes plurality of optical taps for fanning-out the multi-bit optical input signal into the first and second outbound signals and includes a plurality of hollow waveguides extending from the optical taps.

10. An optical architecture comprising:
    first and second riser cards;
    first and second components carried by the first and second riser cards respectively;
    a first matrix to fan-out a multi-bit optical input signal into first and second outbound signals, wherein the first matrix comprises:
    first and second slices, the first and second slices being coupled, each of the first and second slices comprising:
       a primary channel;
       first and second secondary channels in communication with the primary channel; and
       first and second mirrors positioned to reflect a portion of the multi-bit optical input signal between the primary channel and a respective one of the first and second secondary channels; and
    first and second fiber optic cables to carry the first and second outbound signals to the first and second riser cards, respectively.

11. The optical architecture as described in claim 10, further comprising third and fourth fiber optic cables to communicate respective inbound signals from corresponding ones of the first and second riser cards to a second matrix, the second matrix to convert at least one of the inbound signals into a multi-bit output signal.

12. The optical architecture as described in claim 10, wherein the first secondary channel of the first slice is aligned with the first secondary channel of the second slice and the second secondary channel of the first slice is aligned with the second secondary channel of the second slice.

13. The optical architecture as described in claim 12, wherein the first fiber optic cable is communicatively coupled with the first secondary channels of the first and second slices, and the second fiber optic cable is communicatively coupled with the second secondary channels of the first and second slices.

14. An optical architecture comprising:
    first and second riser cards;
    first and second components carried by the first and second riser cards respectively;
    a first matrix to fan-out a multi-bit optical input signal into first and second outbound signals, wherein the first matrix comprises:
       a first slice having a first input port and a plurality of output ports; and
       a second slice having a second input port and a second plurality of output ports;
    first and second fiber optic cables to carry the first and second outbound signals to the first and second riser cards, respectively;
    a first plurality of optical taps corresponding to the first plurality of output ports; and
    a second plurality of optical taps corresponding to the second plurality of output ports.

15. The optical architecture as described in claim 14, wherein the first and second input ports are vertically and horizontally displaced relative to one another, the first and second plurality of output ports being only one of horizontally displaced or vertically displaced.

16. The optical architecture as described in claim 14, wherein the first and second input ports are to receive the multi-bit optical input signal and to fan-out the multi-bit optical input signal via the respective first and second plurality of optical taps to each of the corresponding first and second pluralities of output ports.

17. The optical architecture as described in claim 14, wherein the first plurality of optical taps comprises a first plurality of mirrors, and wherein the second plurality of optical taps comprises a second plurality of mirrors.

18. The optical architecture as described in claim 14, wherein the first plurality of optical taps comprises a first plurality of beam splitters, and wherein the second plurality of optical taps comprises a second plurality of beam splitters.

19. The optical architecture as described in claim 14, wherein power ratios of the first plurality of taps are arranged to deliver portions of the multi-bit optical input signal having a same optical power to each of the first plurality of output ports.

20. The optical architecture as described in claim 14,
wherein the first slice includes a first plurality of hollow waveguides,
wherein each of the plurality of output ports has an associated waveguide of the first plurality of hollow waveguides extending thereto,
wherein the second slice includes a second plurality of hollow waveguides, and
wherein each of the second plurality of output ports has an associated waveguide of the second plurality of hollow waveguides extending thereto.

\* \* \* \* \*